United States Patent [19]
Brackett

[11] Patent Number: 5,896,946
[45] Date of Patent: Apr. 27, 1999

[54] BOARDING LADDER AND WINCH MOUNT SYSTEM FOR BOAT TRAILERS AND THE LIKE

[76] Inventor: Wesley E. Brackett, 517 S. Madison, Lebanon, Mo. 65536

[21] Appl. No.: 08/871,570

[22] Filed: Jun. 4, 1997

Related U.S. Application Data

[63] Continuation of application No. 08/434,971, May 4, 1995, abandoned.

[51] Int. Cl.⁶ .................................................. E06C 5/00
[52] U.S. Cl. ............................ 182/127; 182/93; 182/194
[58] Field of Search .............................. 182/127, 93, 194

[56] References Cited

U.S. PATENT DOCUMENTS

| | | | |
|---|---|---|---|
| 1,231,318 | 6/1917 | Wine | 182/93 |
| 2,204,163 | 6/1940 | Steuber | 182/93 |
| 2,798,652 | 7/1957 | Easton | 182/127 |
| 2,969,123 | 1/1961 | Jamerson et al. | 182/127 |
| 4,113,055 | 9/1978 | Gleockler et al. | 182/127 X |
| 4,199,040 | 4/1980 | Lapeyre | 182/194 X |
| 5,333,323 | 8/1994 | Aymes | 182/93 X |

OTHER PUBLICATIONS

"Bear Trailers" product literature brochure of Bear Trailer Mfg.

*Primary Examiner*—Donald P. Walsh
*Assistant Examiner*—Emmanuel M. Marcelo
*Attorney, Agent, or Firm*—Litman, McMahon & Brown, L.L.C.

[57] ABSTRACT

An access step and winch mounting assembly is provided for a load carrying device, such as a boat trailer. The assembly includes a front member for mounting on a frame of the trailer, a top member extending from the front member and a cross bar connected to the to member. The top member mounts a winch for drawing a load onto the trailer. The cross bar mounts load engaging members. A step subassembly includes a stringer depending downwardly from the cross bar and multiple rungs with arcuate configurations each extending between the front member and the stringer member. The step subassembly is outwardly and laterally convex.

14 Claims, 2 Drawing Sheets

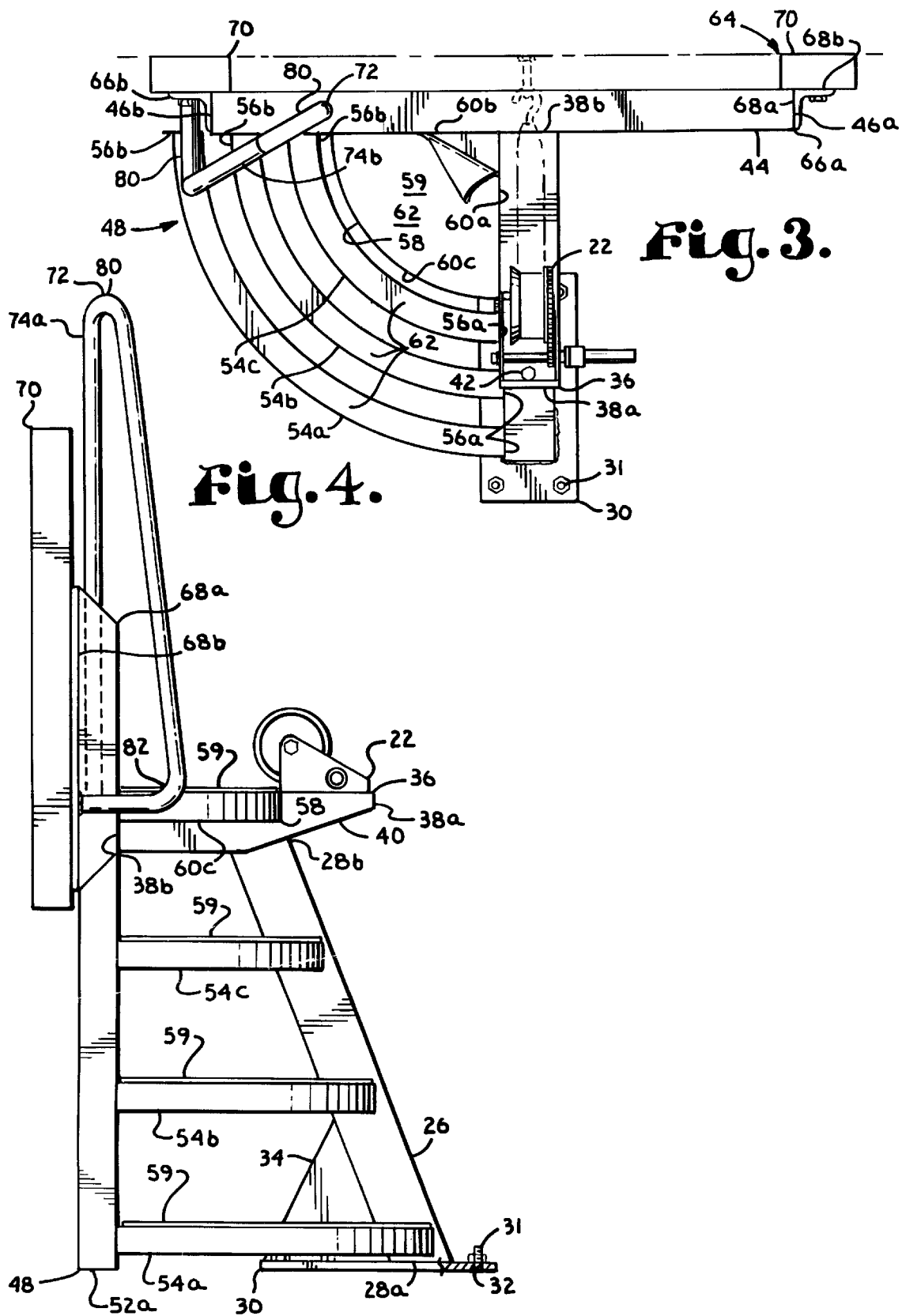

BOARDING LADDER AND WINCH MOUNT SYSTEM FOR BOAT TRAILERS AND THE LIKE

This is a Continuing application of prior complete application Ser. No. 08/434,971, filed May 4, 1995, now abandoned.

BACKGROUND OF THE INVENTION

1. Field of the Invention

The present invention relates generally to trailers, and in particular to a combined access step and winch mounting assembly for a boat trailer.

2. Description of the Related Art

A wide variety of devices have heretofore been devised for transporting loads of various configurations. For example, boats are commonly transported on trailers, and are often stored on trailers during periods of non-use. An important trailer function is providing means for pulling a boat or the like onto the trailer. This is often accomplished by means of a winch, which can be either cranked by hand or electrically powered.

Accessibility to a trailer-mounted boat can be a problem. For example, boarding ladders of the type commonly provided with boats are typically designed for access from the water and thus may be located too high for convenient access to a boat on a trailer. Moreover, the accessibility to a boat on a loading ramp can be significantly restricted due to the submerged position of the portion of the trailer under the boat's stern.

A common type of boat trailer includes a frame with a longitudinal member extending axially and terminating at a tongue mounting a hitch. The longitudinal member of such a conventional trailer commonly mounts a winch mounting post, with a resilient engagement means such as a forked bumper for engaging and positioning the boat bough.

Such boat trailers have the advantage of being relatively easy to construct. However, they have the disadvantage of requiring relatively accurate alignment of the boat and trailer, and the further disadvantage of the boat being difficult to access when placed on the trailer.

Some of these disadvantages have been addressed by trailers with front step structures, such as those manufactured by the assignee of the present invention, Bear Trailer Manufacturing, Inc., which include steps for providing access to the boat and associated with a winch mounted on a post. However, such previous designs typically required a person attempting to board the boat to walk between the boat and the tow vehicle, and often provided only very limited space for foot placement in order to attain the boat deck.

Another function of structures mounted on the fronts of boat trailers is to properly align the boat, especially during loading operations. For this purpose previous devices of the applicant's assignee have provided engagement members adapted for engagement by the front edge of a boat deck, such as that of a pontoon or deck boat, with the boat loaded thereon.

However, heretofore there has not been available a combination access step and winch mounting assembly with the advantages and features of the present invention. The present invention addresses some of the shortcomings of previous load carrying structures.

SUMMARY OF THE INVENTION

In the practice of the present invention, an access step and winch mount system is provided for a boat trailer including a frame with a longitudinal member. A front member includes a lower end connected to the trailer longitudinal member by a mounting plate and an upper end mounting a top member. A cross bar is mounted on the top member and extends laterally therefrom. A step subassembly includes multiple rungs with diameters which decrease upwardly. A hand rail subassembly is mounted on the cross bar and on the step subassembly. A winch is mounted on the top member and includes a strap or cable for connection to a boat, such as a deck boat or pontoon boat, on the trailer.

OBJECTS AND ADVANTAGES OF THE INVENTION

The principal objects and advantages of the present invention include: providing a step structure for a load carrying device; providing such a structure for a boat trailer; providing such a structure for a trailer particularly adapted for carrying a pontoon boat; providing an assembly which includes such a step structure and a winch mounting assembly; providing such a structure which facilitates access to the front deck of a boat on a transport vehicle; providing such an assembly which permits access to the deck of a boat without going between a trailer and a tow vehicle; providing such an assembly which permits climbing access to a load on a transport vehicle by traversing a sloping incline; and providing such an access step and winch mounting assembly which is economical to manufacture, efficient in operation and particularly well-adapted for the proposed use thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a top plan view thereof.

FIG. 4 is an enlarged, side elevational view thereof.

DETAILED DESCRIPTION OF THE PREFERRED EMBODIMENTS

I. Introduction and Environment

Figure 1:
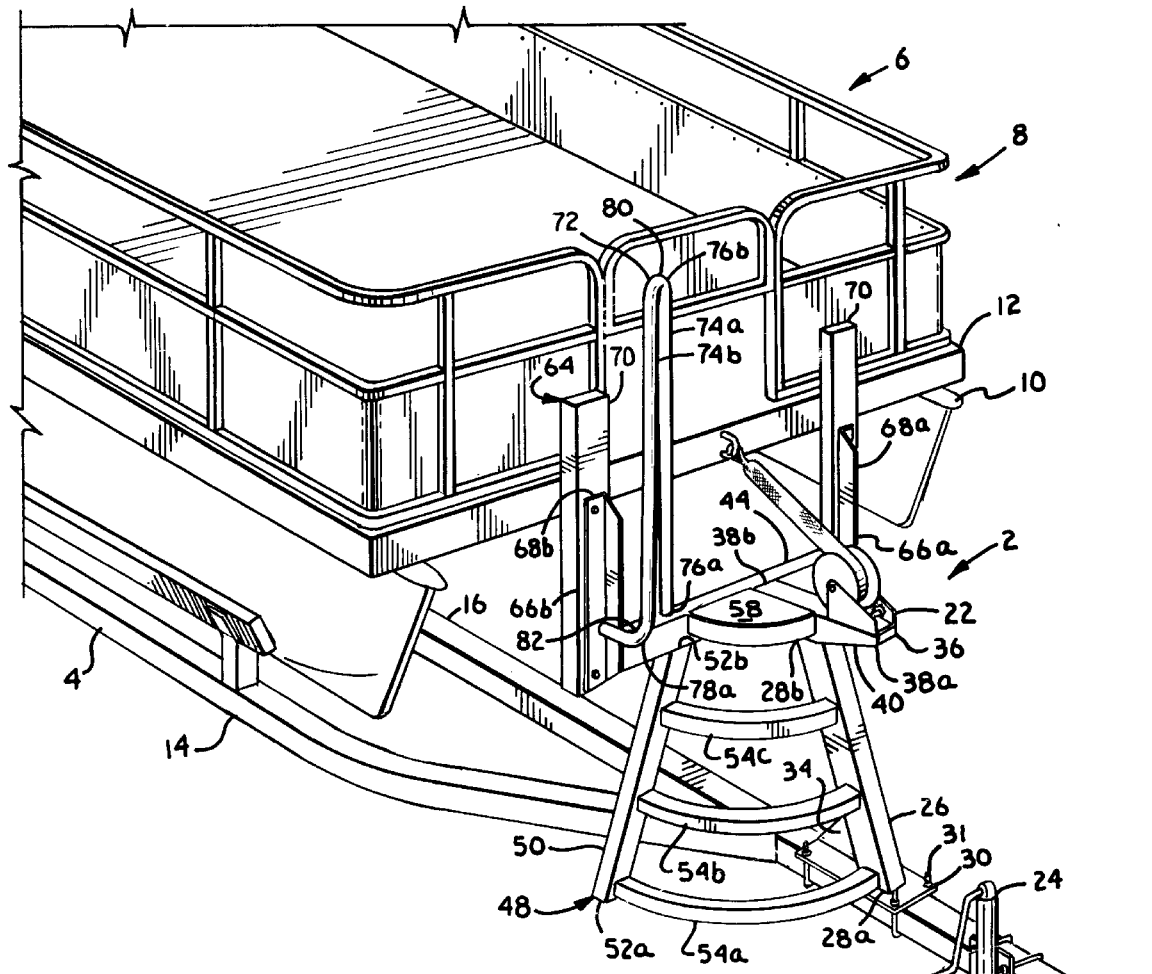
FIG. 1 is an upper, front, right side elevational view of a boarding ladder and winch mount system for boat trailers and the like, embodying the present invention.
Figure 2:
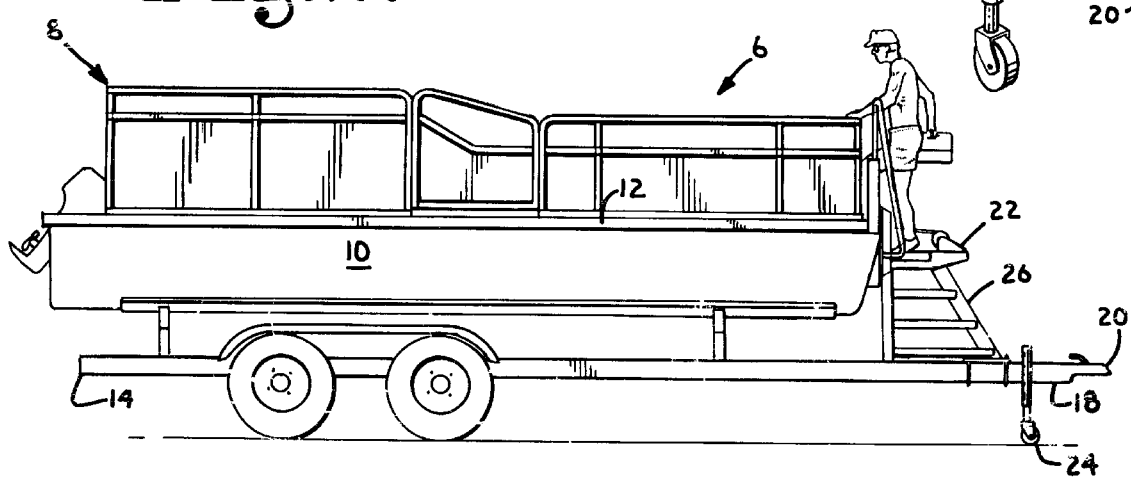
FIG. 2 is a side elevational view thereof, shown mounted on a boat trailer with a pontoon boat thereon.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 2 generally designates an access step and winch mounting assembly for a trailer 4, which is adapted to carry a load 6. Without limitation on the generality of useful applications for the trailer 4, the load 6 can comprise, for example, a pontoon boat 8 comprising a pair of pontoon floats 10 with a deck 12 extending thereacross. Alternatively, the load 6 can comprise other types of boats, such as deck boats, and other loads.

The trailer 4 includes a frame 14 with a longitudinal member 16 having a square tubular cross-sectional configuration and terminating frontally at a tongue 18. The tongue 18 mounts a trailer hitch 20.

Although the access step and winch mounting assembly 2 are designed for a trailer 4 for a pontoon boat 8, various other load carrying devices, such as deck boat trailers, general purpose trailers, truck beds, boat lifts, etc. could be equipped with an access step and winch mounting assembly embodying the present invention.

The trailer 4 also includes a winch 22, which is preferably associated with the trailer tongue 18 and an extendable/retractable guide wheel or tongue jack subassembly 24. Although a manual crank winch 22 is shown, an electric winch could also be mounted on the access step and winch mounting assembly 2.

II. Access Step and Winch Mounting Assembly 2

The access step and winch mounting assembly 2 includes a rectangular cross-sectional tubular front member 26 with a lower end 28a and an upper end 28b. The front member 26 has an orientation sloping rearwardly from bottom-to-top. The front member lower end 28a is beveled and mounts a front member mounting plate 30 which is fixedly connected thereto and includes a plurality of bolt receivers 32 for receiving mounting bolts (e.g., U-bolts) 31 for mounting on the trailer frame longitudinal member 16. Alternatively, the front member lower end 28a could be welded to the trailer frame longitudinal member 16. The base mounting plate 30 is reinforced in its fixed position on the front member lower end 28a by a generally triangular gusset 34 which is welded to the back edge of the front member 26 in proximity to its lower end 28a and to the upper surface of the base mounting plate 30.

A top member 36 comprising a channel section 37 with front and back ends 38a, 38b and a channel-shaped cross-sectional configuration is mounted on top of the front member 26 in fixed connection to the upper end 28b thereof. The semi-closed, channel-shaped cross-sectional configuration of the top member 36 facilitates the drainage of water therefrom and avoids problems of water standing or becoming trapped therein. The top member 36 has a generally longitudinal, horizontal orientation and is downwardly-open for receiving the front member upper end 28a. The top member 36 can be tapered at its front end 38a as shown at 40. The top member 36 mounts the winch 22 in proximity to its front end 38a, for example, by suitable winch mounting bolts 42. The winch 22 is preferably positioned forwardly of the front member upper end 28b.

A cross bar 44 with opposite ends 46a, 46b is mounted on the top member back end 38b and extends generally horizontally and transversely. The cross bar 44 has a generally rectangular tubular cross-sectional configuration.

A step subassembly 48 is mounted on the frame 14 and includes a stringer member 50 with lower and upper ends 52a, 52b and a generally rectangular, tubular cross-sectional configuration. The stringer member 50 is fixedly connected (e.g., by welding or bolting) at its upper end 52b to the cross bar 44 intermediate the top member back end 38b and the cross bar right end 46b. The stringer member 50 extends generally downwardly and laterally outwardly from the cross bar 44 and terminates at its lower end 52a, which is positioned at approximately the level of the front member lower end 28a.

The step subassembly 48 further includes lowermost, intermediate and uppermost rungs 54a, 54b and 54c. Each rung 54a–54c includes a first/front end 56a and a Second/Back end 56a fixedly connected to a respective side of the front member 26 and a second/left end 56b fixedly connected to the front of the stringer member 50. The step subassembly 48 further includes a landing 58 with the general configuration of a quarter circle having a side edge 60a, a back edge 60b and an arcuate outer edge 60c. The landing side edge 60a is connected to the top member 36 along a side flange thereof and to the cross bar 44 along the front face thereof. The rungs 54a–54c and the landing outer edge 58c have diameters which decrease proportionally from bottom-to-top whereby a frusto-conical step surface 62 is formed which converges (tapers) upwardly. The rungs 54a–54c and the landing 58 can be provided with anti-slip material 59 on their upper, tread surfaces.

The rungs 54a–54c and the landing 58 are generally evenly spaced from the approximate level of the front and stringer member lower ends 28a, 50a to their respective upper ends 28b, 50b.

A load engagement subassembly 64 is mounted on the cross bar 44 and comprises a first/left angle member 66a and a second/right angle member 66b each having a respective side flange 68a mounted on a respective cross bar end 46a, 46b whereby the side flanges 46a face inwardly. Each angle member 66a, 66b also includes a rear flange 68b which faces rearwardly. A pair of load engagement members 70 are mounted on the angle member rear flanges 66b and are adapted for engaging the load 6, such as the pontoon boat deck 12 as shown.

A hand rail subassembly 72 is provided and includes a first/inner, generally vertical leg 74a and a second/outer leg 74b which slopes upwardly and inwardly, thereby converging upwardly with the first/inner leg 74a. The first leg 74a includes lower and upper ends 76a, 76b, the lower end 76a being fixedly connected to the cross bar 44, e.g., by welding. The first and second leg upper ends 74b, 78b are connected by a hand rail bite section 80 with an upwardly-convex arcuate configuration for being comfortably grasped.

The second leg lower end 78a mounts an elbow 82 which is fixedly connected, e.g., by welding, to the second angle member 66b on its rear flange 68b. The hand rail assembly 72 thus extends upwardly to a convenient position above the step assembly 48 for grasping by a person wishing to gain access to the load 6 while it is on the trailer 4.

III. Construction and Operation

Without limitation on the generality of useful construction materials and techniques, the access step and winch mounting assembly 2 can be fabricated from any suitable material, such as steel, which can be painted or otherwise protected against rust, corrosion, etc. The assembly 2 can also be manufactured of stainless steel or some other suitable material. The finish can optionally be adapted to match that of the trailer 4.

Since longitudinal members such as that shown at 16 are relatively common on certain types of trailers, e.g., boat trailers, the assembly 2 can be retrofit on existing trailers or installed on new trailers in place of the winch mounting posts which are commonly encountered.

The access step and winch mounting assembly 2 are useful with a wide variety of loads, including boats such as the pontoon boat 8 which is shown.

For use in connection with the pontoon boat 8, the winch 22 is connected to the pontoon boat 8 for pulling same onto the trailer 4. The load engagement members 70 are adapted for engaging the pontoon boat deck 12 front edge whereby the pontoon boat 8 is properly positioned on the trailer 4. The trailer 4 can be towed with the boat 8 or some other load thereon. The step subassembly 48 provides convenient access to the boat deck 12, thus facilitating access to the boat 8 while on the trailer 4. Such access can be particularly convenient during loading and unloading operations, since the access step and winch mounting assembly 2 would provide access from the front of the boat 8 even with the back end thereof partially submerged.

The orientation of the step subassembly 48, i.e., forwardly and laterally, permits access to the boat deck 12 without having to traverse the area between the trailer 4 and a tow vehicle.

It is to be understood that while certain forms of the present invention have been illustrated and described herein, it is not to be limited to the specific forms or arrangement of parts described and shown.

What is claimed and desired to be secured by Letters Patent is as follows:

1. An access step and winch mounting assembly for mounting on a trailer tongue, which comprises:
   (a) a front structural member which is angled upward and rearward from a bottom to a top portion thereof;
   (b) a mount designed to attach said front structural member to the trailer tongue;
   (c) a cross bar with opposite ends;
   (d) a substantially horizontal top member, said top member being attached to and extending substantially perpendicularly outward from said cross bar and connecting directly to said front structural member such that an angle of substantially 90 degrees is formed between said top member and said cross bar, said top member including a winch mounting surface;
   (e) a step stringer attached to and extending downward from said cross bar; and
   (f) a plurality of rungs with opposing first and second ends, said rungs having a spaced horizontal relationship with each other, each said rung being positioned with both of said first and second ends positioned within a pie shaped space defined by the substantially 90 degree angle between said top member and said cross member such that at least one of said rungs occupies at least 25 degrees of said angle between said top member and said cross bar.

2. The assembly of claim 1, wherein:
   (a) said rungs have outwardly and forwardly convex curved configurations between their ends.

3. The assembly according to claim 2, wherein:
   (a) said step stringer comprises a stringer member which slopes rearwardly from bottom-to-top; and
   (b) said rungs define a frusto-conical structure which slopes rearwardly and inwardly from bottom-to-top.

4. The assembly according to claim 3, which includes:
   (a) a lowermost rung having a greatest diameter;
   (b) an intermediate rung having an intermediate diameter; and
   (c) an uppermost rung having a smallest diameter.

5. The invention of claim 1, which includes:
   (a) each said rung having a diameter, said diameters being progressively smaller from bottom-to-top.

6. The assembly according to claim 1, which includes:
   (a) a hand rail connected to said cross bar and extending upwardly therefrom.

7. The assembly according to claim 6, wherein:
   (a) said hand rail comprises an elongated tube with a first leg mounted on said cross bar and a second leg spaced therefrom; and
   (b) a rounded hand rail top interconnecting said first and second legs.

8. The assembly according to claim 1, which includes:
   (a) first and second load engaging means each mounted on a respective cross bar end and projecting upwardly therefrom.

9. The assembly according to claim 1, which includes:
   (a) load engaging means mounted on ends of said cross bar; and
   (b) said load engagement means comprises a pair of generally vertical load engagement members each attached to a respective cross bar end.

10. The assembly according to claim 1, which includes:
    (a) a base plate mounted on said front structural member bottom portion and adapted for connection to said trailer tongue.

11. The assembly according to claim 10, which includes:
    (a) a gusset plate connected to and extending between said front member and said base plate.

12. An access step and winch mounting assembly for a trailer including a trailer frame with a longitudinal member forming a tongue and mounting a trailer hitch, said trailer being adapted for receiving a load, said trailer including a winch for drawing a load onto the frame thereof, which comprises:
    (a) a tubular front structural member with upper and lower ends, said front structural member having an orientation sloping rearwardly from bottom-to-top;
    (b) a base plate fixedly mounted on said front structural member lower end;
    (c) a gusset extending between and fixedly connected to said front structural member adjacent the lower end thereof and to said base plate;
    (d) access step and winch mounting assembly mounting means for mounting said base plate on said trailer frame longitudinal member;
    (e) a top member comprising a downwardly-open channel section extending generally horizontally longitudinally and having front and back ends, said top member being fixedly mounted on said top member with said channel thereof receiving said front structural member upper end;
    (f) winch mounting means for mounting the winch on the top member in proximity to the front end thereof;
    (g) a hollow tubular top bar with first and second opposite side ends, said cross bar being fixedly connected to said top member back end intermediate the cross bar side ends, the cross bar extending generally horizontally transversely;

(h) the step assembly including:
  (1) a stringer member having a tubular cross-sectional configuration and upper and lower ends, said stringer member being fixedly connected at its upper end to said cross bar intermediate said top member back end and a respective cross bar side end, said stringer member having an orientation extending generally downwardly and outwardly from said cross bar connection;
  (2) a lowermost rung;
  (3) an intermediate rung;
  (4) an uppermost rung;
  (5) each said rung having a first end fixedly connected to said front structural member and a second end fixedly connected to said stringer member, each said rung having an outwardly and forwardly convex configuration and a diameter, said lowermost rung having the greatest diameter, said intermediate rung having an intermediate diameter and said uppermost rung having a least rung diameter;
  (6) a landing having a general configuration of a quarter circle with a side edge fixedly connected to said top member and a back edge fixedly connected to said cross bar and a free edge with an arcuate configuration having a diameter less than a diameter of said uppermost rung; and
  (7) said stringer and said landing free edge form a step surface with a frusto-conical configuration converging upwardly and sloping inwardly and rearwardly from bottom-to-top;
(i) a pair of angle sections each having upper and lower ends and being mounted on a respective cross bar side end in proximity to the lower end thereof, each said angle section having a side flange mounted on a respective cross bar side end and a rear flange facing rearwardly;
(j) a pair of load engagement pads each mounted on a respective angle section rear flange and including resilient engagement means for engaging a load on said trailer; and
(k) a hand rail including a first, inner leg with a lower end fixedly mounted on said cross bar and extending upwardly therefrom, said first leg terminating at an upper end, a bite section mounted on said first leg upper end and having a configuration which curves through approximately 180°, a second leg with an upper end connected to said bite section and a lower end, said first leg having an orientation extending generally vertically from said cross bar intermediate said top member back end and a respective side end associated with said step structure; said second leg having an orientation converging upwardly with respect to said first leg, said second leg having a lower end; and an elbow section extending from said second leg lower end to a fixed connection with a respective load engagement member.

13. An access step and winch mounting assembly for mounting on a structure having a frame, which comprises:
  (a) a front structural member with upper and lower ends;
  (b) mounting means for mounting said front structural member of said trailer frame;
  (c) a top member with front and back ends, said top member being mounted on said front structural member upper end;
  (d) a cross bar with opposite ends, said cross bar being mounted on said top member back end intermediate its opposite ends;
  (e) step stringer means for rung support mounted on said cross bar between said top member and a respective cross bar end, said stringer means depending downwardly from said cross bar;
  (f) a rung extending generally horizontally between and connected to said front structural member and said stringer means at respective opposite ends of said rung;
  (g) a top landing with a longitudinal edge connected to said top member and a transverse edge connected to said cross bar; and
  (h) said top landing has a configuration generally comprising a quarter-circle with a forwardly and outwardly convex curved edge.

14. An access step and winch mounting assembly for mounting on a structure having a frame, which comprises:
  (a) a front structural member with upper and lower ends;
  (b) mounting means for mounting said front structural member of said trailer frame;
  (c) a top member with front and back ends, said top member being mounted on said front member upper end;
  (d) a cross bar with opposite ends, said cross bar being mounted on said top member back end intermediate its opposite ends;
  (e) step stringer means for rung support mounted on said cross bar between said top member and a respective cross bar end, said stringer means depending downwardly from said cross bar;
  (f) a rung extending generally horizontally between and connected to said front member and said stringer means at respective opposite ends of said rung;
  (g) a top landing connected to said top member and said cross bar; and
  (h) said top member comprises a channel section receiving said front member upper end and mounting said cross bar.

* * * * *